: US008817196B2

(12) United States Patent
De La Tocnaye et al.

(10) Patent No.: US 8,817,196 B2
(45) Date of Patent: Aug. 26, 2014

(54) OPTICAL SHUTTERING DEVICE BASED ON LIQUID CRYSTALS WITH ATTENUATION OF SWITCHING NOISES OF SAID LIQUID CRYSTALS, CORRESPONDING VIEWING GOGGLES AND DISPLAY DEVICE

(75) Inventors: Jean-Louis De Bougrenet De La Tocnaye, Guilers Kerhuo (FR); Bertrand Caillaud, Brest (FR); Emmanuel Daniel, Le Relecq Kerhuon (FR); Robert Bellini, Brest (FR); Olivier Castany, Plouzane (FR)

(73) Assignee: Institut Telecom/Telecom Bretagne, Brest (FR)

( * ) Notice: Subject to any disclaimer, the term of this patent is extended or adjusted under 35 U.S.C. 154(b) by 237 days.

(21) Appl. No.: 13/144,449

(22) PCT Filed: Nov. 16, 2009

(86) PCT No.: PCT/EP2009/065257
§ 371 (c)(1),
(2), (4) Date: Nov. 1, 2011

(87) PCT Pub. No.: WO2010/081573
PCT Pub. Date: Jul. 22, 2010

(65) Prior Publication Data
US 2012/0038840 A1 Feb. 16, 2012

(30) Foreign Application Priority Data
Jan. 13, 2009 (FR) ...................................... 09 50153

(51) Int. Cl.
*G02F 1/1335* (2006.01)
*H04N 13/04* (2006.01)

(52) U.S. Cl.
USPC ................................ 349/13; 349/33; 348/56

(58) Field of Classification Search
USPC ..................... 349/13, 33; 348/56; 351/159.39
See application file for complete search history.

(56) References Cited

U.S. PATENT DOCUMENTS

| 3,737,567 | A | * | 6/1973 | Kratomi | 348/56 |
| 4,907,860 | A | * | 3/1990 | Noble | 349/15 |
| 2007/0132696 | A1 | * | 6/2007 | Yamashita | 345/98 |
| 2010/0039588 | A1 | | 2/2010 | Caillaud et al. | |

FOREIGN PATENT DOCUMENTS

| EP | 0617312 A2 | 9/1994 |
| EP | 1241514 A2 | 9/2002 |

(Continued)

OTHER PUBLICATIONS

International Search Report and Written Opinion dated Jan. 11, 2010 for corresponding International Application No. PCT/EP2009/065257, filed Nov. 16, 2009.

(Continued)

*Primary Examiner* — Michael Caley
(74) *Attorney, Agent, or Firm* — David D. Brush; Westman Champlin & Koehler, P.A.

(57) ABSTRACT

An optical shuttering device is provided, which includes an optical cell with a liquid crystal material between first and second transparent substrates and controlled by an electronic switching circuit. The switching circuit includes a power supply module, providing a control voltage, and a switching element mounted in series between the power supply module and the cell, making it possible to switch the cell between an on state and an off state. The electronic switching circuit furthermore includes a current source mounted in series between the power supply module and the switching element. The substrates preferably have different thickness and material.

11 Claims, 4 Drawing Sheets

(56) References Cited

FOREIGN PATENT DOCUMENTS

| EP | 1798710 | A2 | 6/2007 |
|---|---|---|---|
| FR | 2914755 | A1 | 10/2008 |
| JP | 2000284224 | | 10/2000 |

OTHER PUBLICATIONS

English Translation of the International Preliminary Report on Patentability and Written Opinion dated Aug. 2, 2011 for corresponding International Application No. PCT/EP2009/065257, filed Nov. 16, 2009.

English Translation of the International Search Report dated Jan. 11, 2010 for corresponding International Application No. PCT/EP2009/065257, filed Nov. 16, 2009.

French Search Report dated Jul. 2, 2009 for corresponding French Application No. FR 0950153, filed Jan. 13, 2009.

\* cited by examiner

Optical response

Acoustic response

OPTICAL SHUTTERING DEVICE BASED ON LIQUID CRYSTALS WITH ATTENUATION OF SWITCHING NOISES OF SAID LIQUID CRYSTALS, CORRESPONDING VIEWING GOGGLES AND DISPLAY DEVICE

CROSS-REFERENCE TO RELATED APPLICATIONS

This application is a Section 371 National Stage Application of International Application No. PCT/EP2009/065257, filed Nov. 16, 2009 and published as WO 2010/081573 on Jul. 22, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of optical shuttering devices implementing liquid-crystal-based materials.

More specifically, the disclosure pertains to a technique for limiting the noises audible during the switching of said liquid crystals.

The disclosure finds special but not exclusive application in the making of a liquid-crystal-based alternating vision goggle set (or alternating-viewing spectacles based on liquid crystals), its main characteristic being that it reduces the switching noises of the liquid crystals.

The disclosure can be applied more particularly to display screens (viewing) for example in the field of mobile telephony.

BACKGROUND OF THE DISCLOSURE

The entire description here below is situated in the context of active goggles for viewing of digital contents in relief (3D viewing).

Such a goggle set classically has a shutter based on at least one liquid-crystal-based cell.

More specifically, the shutters fitted into goggles of this type consist of at least one cell formed by two substrates placed so as to be facing each other and enclosing a liquid crystal. A majority of such substrates are made of a rigid and transparent material such as glass.

To make a shutter that is both light and compact, it is the common practice to use liquid-crystal-based cells which are light and compact. To reduce the weight of this type of cell, the classic practice is to reduce the thickness of the glass substrates by using glass substrates of small thickness, better known as thin glass substrates whose thickness classically ranges from 0.5 to 1 mm.

Such a goggle set are described especially in the patent application U.S. Pat. No. 6,943,852. This goggle set consists of a single cell formed by a first and second substrate situated so as to be facing each other. The space between these two substrates forms a cavity receiving a nematic type of liquid crystal.

It may be recalled that liquid-crystal-based materials are materials whose optical properties, especially their birefringence, can be modified by the application to these materials of an electrical field E created by the application of a control voltage V between the two substrates using transparent thin electrodes. When the liquid crystal is placed for example between a polarizer and an analyzer that are crossed, then a voltage-controlled optical shutter is obtained. A liquid-crystal-based optical shutter of this kind then has at least two states depending on whether or not a voltage is applied to the terminals of the two substrates:

a state known as a "passing" state in which it allows light to pass through, and a "blocking" state in which it does not allow light to pass through or allows a very small part of this light to pass through.

The requirement of quality in the rendering of motion in 3D vision has led for example to the development of techniques of triple-flash projection timed at 144 Hz instead of a double-flash technology timed at 96 Hz (i.e. an image projected alternately on each eye at a rate that cannot be perceived by the eye) for a standard sampling cycle of the cinema at 48 Hz.

Such techniques therefore dictate a technology of fast ocular shutters and an optical quality comparable with cinema hall projection quality dictated by Hollywood studios.

However, the classically used nematic liquid crystals cells do not make it possible to obtain a sufficiently short response time for the passage from the blocking state to the passing state known as the transparent state (also called aperture time). Indeed, this technology is limited to aperture times of the order of a few milliseconds. The nematic technology is in this case compatible only with the double-flash projection system timed at 96 Hz and not with triple-flash systems timed at 144 Hz.

Another technology used to make dynamic shutters is based on the use of smectic liquid crystals. This smectic technology makes it possible to obtain:

a short response time ranging from about 100 ms to a few hundred µs for the passage from the transparent state to the blocking state;

a short response time ranging from about 100 ms to a few hundred µs for the passage from the blocking state to the transparent state.

The symmetry of switching between the blocking state and the transparent state will be noted. For example, ferroelectric smectic liquid crystals (FLC) or else anti-ferroelectric smectic liquid crystals (AFLC) are thus faster than nematic liquid crystals.

The use of faster liquid crystals in the passage from nematic technology to smectic technology as well as the increase in the beat frequencies (passing from 48 images per second to 144 images per second) entails higher control voltages for the liquid crystal for shorter rise times. It must be known that the liquid crystal thicknesses are also smaller: 1-2 µm for FLCs as compared with 5-10 µm for the different nematics. The result thereof is that the fields applied are higher (10V/µm for smectic liquid crystals to a few V/µm for nematic liquid crystals).

Thus, the increase in the beat frequencies and the electrical fields applied to the liquid crystal are accompanied by a noise source that proves to be inconvenient for the user. Indeed, given the proximity of the viewing goggle set (in this particular example) and of the use's auditory apparatus, the switching noises of the liquid crystal cells become troublesome when the liquid crystal cells are in proximity to the hearing equipment.

More specifically, whether it is in nematic technology or smectic technology, noise is caused chiefly by the vibration of the glass substrates when, in order to make the liquid crystal switch over, alternately positive and negative electrical voltages (in square-wave form) are applied to the glass substrates constituting a shutter cell (in the case of a viewing goggle) and to the glass substrates of the display unit (for example a portable telephone screen).

Indeed, under a control voltage V, the resulting electrostatic force exerted on the glass substrates at a frequency situated in the audio range causes the substrates to vibrate, the result of which is an acoustic vibration in the audible spectrum.

It can be shown that the amplitude of the vibrations induced by this electrostatic force is all the greater as the glass substrate is thin.

Now, this problem of noise generation is all the more accentuated as the optical shuttering devices must be integrated into the lightest possible devices, for example a viewing goggle set or a screen of a display device, requiring ever thinner glasses.

In other words, the weight reduction in devices that is sought by the manufacturers of these devices is limited by this noise generation coming from acoustic vibrations (or waves) that are propagated all the more easily as the thickness of the glass substrates is small. This problem is accentuated with the use of smectic liquid crystals because of significantly higher electrical fields than is the case with the nematic crystals.

SUMMARY

One particular embodiment of the invention proposes an optical shuttering device comprising:
  an optical cell formed by a first transparent substrate and a second transparent substrate laid out so as to be facing each other to form a free space;
  a liquid crystal material placed in said free space;
  an electronic circuit for switching said cell comprising:
    a power supply module providing a control voltage;
    a switching element series-mounted between said power supply module and said cell enabling said cell to be made to switch between a passing state and a blocking state.

According to this embodiment, the invention is noteworthy in that the electronic switching circuit furthermore comprises a current source series-mounted between the power supply module and the switching element.

Thus, the embodiment relies on a wholly novel and inventive approach to attenuating the noise caused by the vibration of this glass substrate during the switching of the liquid crystal, and achieves this result by control over the pulse forms of the control voltage of the liquid cells of the cell. In particular, the use of a series-mounted current source according to an embodiment of the invention makes it possible to modify the rise time (the slope) of the electrical pulse applied to the cell.

Through this electronic correction, it then becomes possible to use substrates of smaller thickness, thus optimizing the weight of the optical cell and in particular that of the optical shuttering device.

Advantageously, the first and second substrates have respective thicknesses that are different and such that:
  a total cumulated thickness of said first and second substrates is smaller than or equal to 2.50 mm; and
  the thickest substrate among the first and second substrates is made of glass and possesses a thickness greater than 0.70 mm.

Thus, according to this configuration, it is possible to use at least one thin substrate in order to limit the weight of the optical cell. Indeed, the absorption of the vibrations induced by the liquid crystal is all the more efficient as the glass substrate is thick. According to this configuration, the vibrations of the substrates induced by the electrical field are dampened by the thicker substrate.

Again, the use of glass substrates of a thickness greater than or equal to 0.70 mm enables the cell to be sufficiently rigidified and therefore restricts the vibratory flexing of the first and second substrates. This advantageously has the effect of reducing the acoustic noise level in the cell while restricting the weight of the cell and increasing its robustness.

Advantageously, the least thick substrate is made of glass and has a thickness less than or equal to 1 mm.

Thus, it is possible to reduce the weight of the cell while at the same time limiting the vibrations induced by the electrical field.

Again, the least thick substrate is made of plastic and has a thickness of less than or equal to 0.5 mm.

Thus, the weight of the cell is optimized.

According to an advantageous mode of implementation of an embodiment of the invention, the liquid crystal material comprises an association of at least one liquid crystal and one polymer, thus forming a liquid crystal gel stabilized by said polymer.

Thus, the slope of the switching times of the liquid crystal can be adjusted so as to limit the percussion noise. Indeed, the presence of a polymer is accompanied by an increase in the switching time because of the resistance of the polymer chain to the movements of the liquid crystal molecules. This mechanism has the effect of reducing the acoustic noise by restricting the impact of the electrical percussion on the rotation motion of the directional axis of the molecules.

According to another advantageous characteristic of an embodiment of the invention, the liquid crystal material comprises an association of at least one ferroelectric smectic liquid crystal FLC or anti-ferroelectric smectic liquid crystal AFLC and a polymer, thus forming a liquid crystal gel stabilized by said polymer, better known as PSFLC or PSAFLC.

Thus, the slope of the switching time of the liquid crystal can be adjusted and the original percussion noise coming from the switching of the smectic liquid crystal can be restricted.

According to one advantageous characteristic of an embodiment of the invention, said association of at least one liquid crystal and one polymer is such that the concentration in mass density of the polymer ranges from 10% to 15%.

Thus, the switching times of the liquid crystal can be increased especially because of the resistance of the polymer chain to the motions of the molecules without affecting the optical quality of the material and in preventing the resultant optical diffusion resulting from greater polymer concentrations.

According to another major characteristic of an embodiment of the present invention, the device further comprises at least one transparent layer of visco-elastic material.

The use of a layer of visco-elastic material makes it possible to absorb the acoustic and/or mechanical energy and thus further reduce the level of acoustic noise generated at the shutter.

In another embodiment, the invention pertains to a set of viewing goggles implementing the above-mentioned optical shuttering device.

In another embodiment, the invention pertains to an optical display device implementing the above-mentioned optical shuttering device.

BRIEF DESCRIPTION OF THE DRAWINGS

Other objects, features and advantages shall appear from the following description given by way of a non-exhaustive example and from the appended drawings, of which:

FIG. 2 is a schematic view of the different elements forming a shutter of the liquid-crystal-based viewing goggle set of FIG. 1a;

DETAILED DESCRIPTION OF ILLUSTRATIVE EMBODIMENTS

Here below in this document, the description shall focus more particularly on the problems that the inventors have faced in the field of goggle set for 3D viewing of digital video contents. The invention is not limited of course to this particular field of application but can also be implemented in many other fields, for example in displays (viewing) for mobile telephony and more generally in all cases where the goals listed here below are interesting.

Figures 1A, 1B:
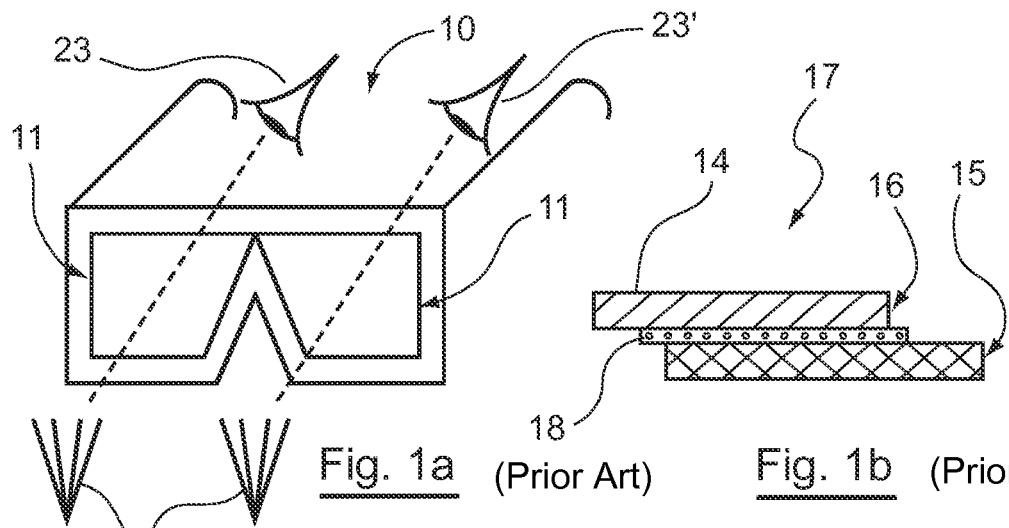
FIG. 1a is a schematic view of a classic 3D viewing goggle set.
FIG. 1b is a schematic view of a classic shutter with which a viewing goggle set is equipped.

FIG. 1a provides a schematic illustration of a goggle set 10 for 3D viewing of digital video contents 40 coming from a projector (not shown).

Figure 2:
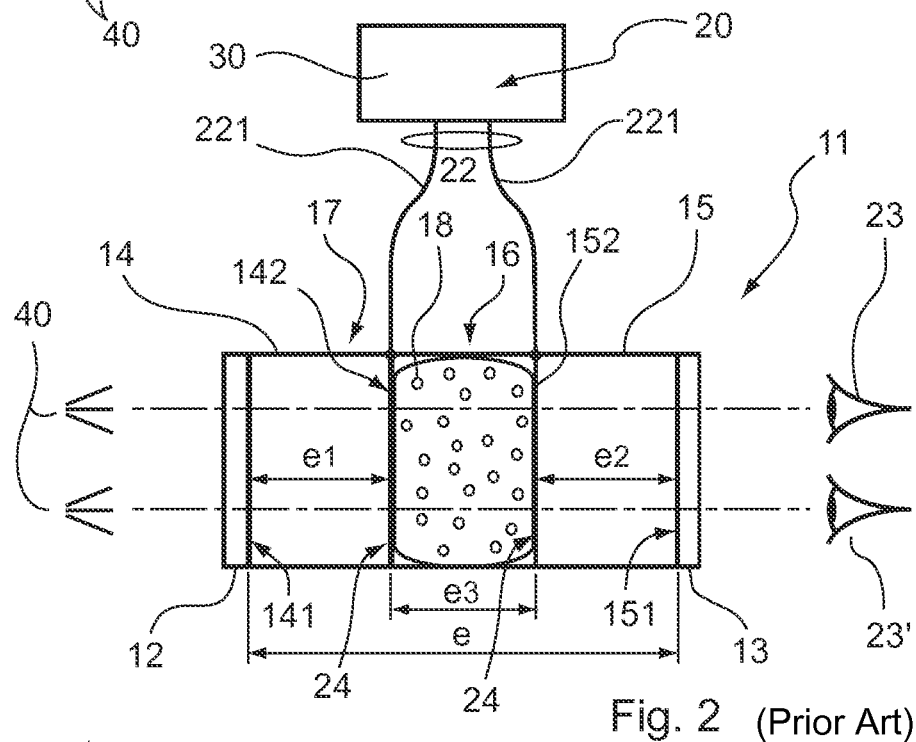

Classically, along each axis of view of a user's right eye 23 and left eye 23', the viewing goggle set 10 has an optical shutter 11 formed especially by a cell 17 formed by a first substrate 14 and a second substrate 15 (FIG. 2). This device is described in fuller detail with reference to FIG. 2.

This shutter 11 is formed classically by other elements, not shown in this FIG. 1a for the sake of simplicity, such as for example a shell for protecting the cell 17.

FIG. 1b provides a schematic illustration of a cell 17 of a shutter 11, for example a cell 17 of a left shutter of the classic viewing goggle set 10 of FIG. 1. This cell 17 is formed by a first substrate 14 and a second substrate 15 placed so as to be facing each other with a slight offset. A liquid crystal 18 is then placed in a space 16 (more amply described here below) to constitute the liquid crystal shutter 11.

As illustrated in FIG. 2, the optical shuttering device includes several elements needed for its implementation.

Thus, this optical shuttering device consists of a cell 17 formed by a first substrate 14 and a second substrate 15 placed so as to be facing each other, each substrate being made out of a transparent material (for example glass).

Classically, during the assembling of the first and second substrates (14, 15) with respective thicknesses (e1, e2), spacers (not shown) are used to create a space 16 with a thickness e3 between these two substrates once they are assembled. The liquid crystal 18 is injected into the space 16 to form a layer of liquid crystal 18 with a thickness e3 far smaller than the thicknesses e1 and e2 of the first and second substrates. The liquid crystal 18 based optical cell 17 is thus formed.

As already indicated, fast shutters presently use a ferroelectric smectic type fast liquid crystals (or FLCs: ferroelectric liquid crystals) which have a short response time of the order of 100 µs for passing from the state known as the "transparent" state to the blocking state and symmetrically a short aperture time of the order of 100 µs for passing from the blocking state to the transparent state.

To make a liquid-crystal-based fast shutter, it is therefore this type of liquid crystal 18 that is classically used.

The first and second substrates (14, 15) each respectively comprise an external face (141, 151) and an internal face (142, 152).

Each internal face (142, 152) furthermore has a deposit of transparent conductive electrodes 24.

To power on the liquid crystal 18 contained in the space 16, these electrodes 24 are connected by two electrical wire links 221 to an electronic switching circuit 30 of the cell 17.

The first and second substrates (14, 15) are therefore electrically connected to the electronic switching circuit 30. This electronic switching circuit 30 is more amply described here below.

The electronic switching circuit 30 is used to deliver an alternating control voltage 22 to the two substrates (14, 15) of the cell 17. This control voltage 22 thus enables the liquid crystal 18 to be switched over. In the case of a smectic liquid crystal, this control voltage has the shape of a symmetrical square wave between a positive voltage +V and the voltage −V (as described here below with reference to FIG. 3).

Classically, the control voltage 22 is timed by a synchronization signal 20. This signal can be sent out for example by the projector (not shown) sending out the digital video content 40. It can also come from a synchronization module internal to the goggle set and situated for example in one arm of the goggle set.

In order to polarize the incoming and outgoing light from the projector, the first and second substrates (14, 15) of the cell 17 respectively comprise, on their external face (141, 151), a first and second polarizer (12, 13).

In the example of FIG. 2, to reduce the manufacturing costs, the cell 17 of the optical shuttering device is the only cell. Naturally, the present invention can be applied equally well to this type of single cell and to two independent cells each placed so as to be facing a viewing axis of the user (as illustrated in FIG. 1a) and also synchronized by the same synchronization signal 20.

In practice, an embodiment of the present invention proposes the use of a ferroelectric smectic type liquid crystal 18 stabilized by a polymer chain, thus forming a polymer gel. A liquid crystal of this kind is better known as a PSFLC gel. This choice ensures very high resistance of the liquid crystal 18 to impacts as well as optical quality on the entire surface of the cell 17 thus favoring the making of a single cell 17. The use of a liquid crystal of this kind is already known from U.S. application Ser. No. 12/594,796, published as U.S. Application Publication No. 2010/0039588 (corresponding to French Application filing number FR0702441, filed Apr. 3, 2007), and filed by the author of the present invention. The use of different liquid crystals is more amply described here below.

Figure 3:
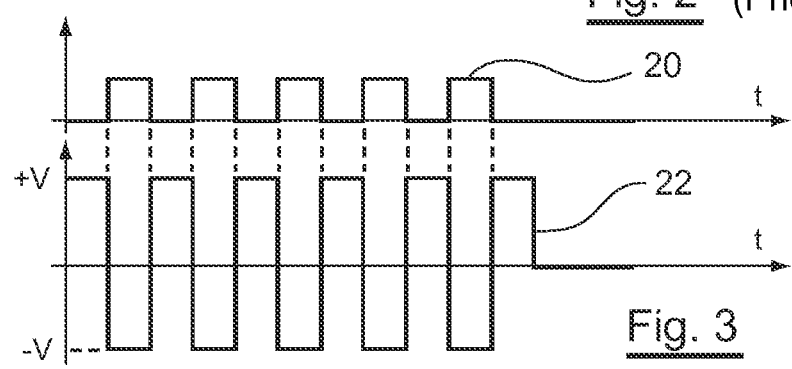
FIG. 3 is a schematic illustration of the timing diagrams of a synchronization signal and of the associated control voltage for the powering-on of a liquid-crystal-based cell of FIG. 2.

FIG. 3 presents an example of a diagram of the synchronization signal 20 and, in response to this synchronization signal, a diagram of the control voltage 22 of the liquid crystal 18 contained in the cell 17.

The synchronization signal 20 is typically an alternating square-wave signal timed at a frequency compatible with well-known 3D projection techniques, for example of the double-flash type (timed at 96 Hz).

The powering-on of the cell 17 is activated for example by each of the leading and trailing edges of the synchronization signal 20. For example, the liquid crystal 18 is powered at a control voltage 22 of −V volts at each leading edge of the synchronization signal 20 and at a control voltage 22 of +V volts at each trailing edge of the synchronization signal 20.

Without detection of a synchronization signal 20, the liquid crystal 18 is not supplied with power (0 volts).

This switching of the liquid crystal 17 is described in greater detail here below with reference to FIGS. 5, 6a to 6d, 7 and 8a to 8d.

As described here above, at a control voltage V, an electrostatic force is created, generating an oscillating force at a frequency situated in the audio range which is then transmitted to the glass substrates in the form of an acoustic vibration.

Indeed, a liquid crystal cell can be likened, in an initial analysis, to a capacitor with a capacitance C. At the application of an electrical field E, an electrostatic force F is created. In a known manner, this force is expressed in the following form:

$F = d(W)/d(e) = (\frac{1}{2})d(CV^2)/d(e)$, where W is the work, e is the thickness between the plates, C the capacitance and V the voltage; $d(W)/d(e)$ expresses the derivative of W relatively to e.

Assuming that the control voltage V applied is constant, the force is expressed as follows:

$$F = (V^2/2)d(C)/d(e) = -V^2 \epsilon_o \epsilon_r S/2e^2$$

In this formula, V is the control voltage applied to the terminals of the cell, S is the surface area of the plates of the capacitor and e is the thickness between these plates (i.e. the liquid crystal thickness between the substrate for a liquid-crystal-based optical cell).

The values of $\epsilon_o$ and $\epsilon_r$ are respectively the dielectric permittivity of the vacuum and the relative permittivity of the material. If the electrostatic force F is periodic, with a period double that of the control voltage V applied (the voltages +V and −V of the square wave are equivalent), then the glass vibrates and gets relaxed during the passage through the value 0 of the force F.

It must be noted that the amplitude of the vibrations is greater in the presence of the liquid crystal in the cell. Indeed, with the voltage modifying the value of $\epsilon_r$, the amplitude of the vibration will depend on the response of the liquid crystal to the applied field E. This phenomenon can be amplified by reorienting the liquid crystal.

Also, the thickness of the glass and its rigidity are two other parameters to be considered.

In short, the amplitude of the noise perceived by the user and generated by the vibration of the glass depends chiefly on the control voltage V applied to the substrates and the thickness e between the glasses (in other words the electrical field E), these parameters acting quadratically.

The Table 1 introduced here below provides information on excess noise values caused by the vibrations of the first and second substrates (14, 15) of FIG. 2.

TABLE 1 table of noise values measured in dBa for different configurations

| Configuration | Excess noise expressed in dBa | |
|---|---|---|
| | Without electronic correction | With electronic correction |
| Empty cell (C0) | 0.3 | — |
| 0.5 mm × 0.5 mm (C1) | 17.6 | 12.5 |
| 0.5 mm × 1.1 mm (C2) | 15.6 | 9.4 |
| 1.1 mm × 1.1 mm (C3) | 15.4 | 7.8 |

These noises, expressed in dBa, are measured in an anechoic chamber for different configurations of the cell 17 formed by the first and second glass substrates (14, 15) of respective thicknesses e1 and e2 and for a same liquid crystal 18, namely:
  an initial configuration C0 without liquid crystal 18 inside the space 16 of the cell 17;
  a first configuration C1, called a symmetrical configuration, with a liquid crystal 18 in the space 16 of the cell 17, and with thicknesses e1 and e2 identical and equal to 0.5 mm;
  a second configuration C2, called a dissymmetrical configuration, with a liquid crystal 18 in the space 16 of the cell 17, and with a thickness e1 equal to 1.1 mm and a thickness e2 equal to 0.5 mm;
  a third symmetrical configuration C3, with a liquid crystal 18 in the space 16 of the cell 17, and with thicknesses e1 and 2 that are identical and equal to 1.1 mm.

This table 1 also gives noise values with and without electronic correction for each configuration. This electronic correction is described in greater detail here below in the description and shall not be discussed for the time being.

The cell 17 has a total thickness e corresponding approximately to the sum of the thickness e1 of the first substrate 14 and the thickness e2 of the second substrate. In this approximation, the thickness e3 of the layer of liquid crystal material contained in the free space 16 formed between the first and second substrates (14, 15) is considered to be negligible relatively to the thicknesses e1 and e2 of the first and second substrates so that $e \approx e_1 + e_2$.

According to the initial configuration C0 of table 1, the excess noise measured (for a cell 17) is 0.3 dBa (without electronic correction). This measurement entirely fits the observation according to which the noise of a cell 17 based on liquid crystal 18 is due in great part to the presence of the liquid crystal ($\epsilon_r$ at a high value) and to the vibrations induced by the layer of liquid crystal material.

We shall now consider the first and third configurations C1 and C3 respectively. These configurations are used classically to make a liquid crystal cell 17, each having advantages and drawbacks more amply described here below.

According to the third configuration C3 of the table 1, conventionally it is the classic practice to use a first and a second glass substrate whose standard thickness is about 1.10 mm. This configuration is symmetrical. The total thickness e of the cell 17 is then about 2.20 mm and the excess noise measured (for a cell 17) is 15.4 dBa (without electronic correction).

According to the first configuration C1, which is also symmetrical, each substrate has a thickness equal to 0.5 mm, i.e. a thickness that is halved for each substrate as compared with the third configuration C3. The excess noise measured (for a cell 17) is in this case 17.6 dBa (without electronic correction).

Thus, the measurement of the noise associated with the first configuration C1 as compared with the measurement with the noise associated with the third configuration C3 clearly illustrates an observation according to which the absorption of the vibrations induced by the electrostatic force F in the presence of liquid crystal material is all the more efficient as the glass substrate is thick.

The third configuration C3 therefore attenuates the vibrations.

According to one embodiment of the invention, the limitation of the total thickness e of the cell 17 limited to a value of 2.50 mm, advantageously limits its weight and the amount of space it takes up while at the same time ensuring a high degree of robustness. Beyond this value, the weight of the cell 17 and, even more so the weight of the viewing goggle set 10, become a prohibitive criterion as regards the application in view.

For example, for a mass density of glass equal to 2.5 kg/l, a usual trapezoidal shutter with ad hoc dimensions (for example for the left eye 23' and taking one cell per eye) and a total thickness e≅e1+e2=2.5 mm, we obtain a mass of 17 grams of a cell 17 formed by a first and a second substrate made of glass (for example BK7), for a shutter. It will be noted that for a goggle set comprising two shutters for the right eye 23 and the left eye 23', this value has to be multiplied by two, giving 34 grams for the shutters alone.

Beyond this value, the mass of the cell 17, and even more so that of the viewing goggle set 10, become a prohibitive criterion as regards the application aimed at.

In conclusion, although the cell of the first configuration C1 has a lower mass than that of the third configuration C3, the first configuration C1 cannot be used to absorb as many vibrations induced by the electrostatic force as the third configuration C3.

We shall now describe the second configuration C2 according to a particular embodiment of the invention.

In this second configuration C2, the first substrate 14 is the thickest substrate with a thickness e1 equal to 1.1 mm and the second substrate 15 is the least thick substrate with a thickness e2 equal to 0.5 mm. This is therefore a dissymmetrical configuration. In this second configuration C2, the excess noise measured (for a cell 17) is 15.6 dBa (without electronic correction).

Thus, if we compare the noise measurement made in the third configuration C3, the use of two substrates of different thicknesses (asymmetrical configuration) advantageously enables the absorption of a part of the vibrations induced by the liquid crystal material while at the same time procuring the benefit of a structure that is optimized in terms of mass, thickness and robustness. Through the use of a glass substrate with a smaller thickness e2, the mass of the cell 17 is reduced and at the same time a reduction in vibrations is enabled. Indeed, the absorption of the acoustic waves or vibrations is all the more efficient as a substrate is thick. By its thickness, the first substrate which is the thickest substrate restricts the vibrational deflection of the first and second substrates and thus reduces the level of acoustic noise generated by the optical shuttering device during its operation.

In one preferred embodiment, the thinnest substrate is placed towards the exterior of the goggle set while the thickest substrate is placed beside the eye, i.e. as close as possible to the user's auditory apparatus.

For example, for a mass density of the glass of 2.5 kg/l, a usual shutter with a trapezoidal shape (for example for the left eye and taking one cell per eye) and a total thickness e≅e1+e2=1.6 mm (configuration C2), we obtain a mass of 11 grams of a cell 17 formed by a first substrate made of glass (BK7 type) and a second substrate made of glass of a "thin" type. It will be noted that for a pair of goggles having two shutters (right eye and left eye), this value must be multiplied by two. Such a configuration may for example by obtained with a first substrate 14 made of glass with a thickness e1 equal to 1.1 mm and a second substrate 15 made of glass of a "thin" type with a thickness e2 equal to 0.5 mm.

Thus, according to one particular embodiment of the invention, the first and second substrates (14, 15) of the cell 17 have respective thicknesses e1 and e2 that are different and such that:

the total cumulated thickness e of said first and second substrates is smaller than or equal to 2.50 mm; and the thickest substrate among said first and second substrates is made of glass and has a thickness greater than or equal to 0.70 mm, and the least thick substrate is made of glass and has a thickness lower than or equal to 1 mm.

Indeed, the use of glass substrates with a thickness greater than or equal to 0.70 mm enables the cell to be made sufficiently rigid and therefore restricts the vibrational flexing of the first and second substrates. This has the advantageous effect of reducing the acoustic noise to the level of the cell 17 while at the same time limiting the weight of the cell.

According to another embodiment of the invention, the least thick substrate is made of a plastic material and has a thickness smaller than or equal to 0.50 mm.

The use of a plastic material to constitute the second substrate reduces the weight and thickness of the device. Indeed, the flexible substrates made of plastic have very small thicknesses and a relative density (or specific gravity) smaller than that of glass.

This alternative therefore combines a glass substrate (which provides the rigidity of the component) with a plastic substrate having optical properties adapted to the application. The replacement of a glass substrate by thinner plastic theoretically reduces the noise source by the use of a thicker glass substrate when the thickness e of the cell 17 is imposed. Not only is the plastic layer less noisy (with a lower transmission of acoustic energy) but its thinness makes it possible to have a thicker glass layer, and the effect of this is to rigidify it (and rigidify the assembly) and therefore limit the vibrational flexing of the cell 17.

However, this embodiment makes it necessary to set up a certain compromise between the search for the lowest possible mass for the optical cell 17 and the need to obtain the best possible optical quality especially because the plastic film has lower optical qualities than glass.

Figure 4:
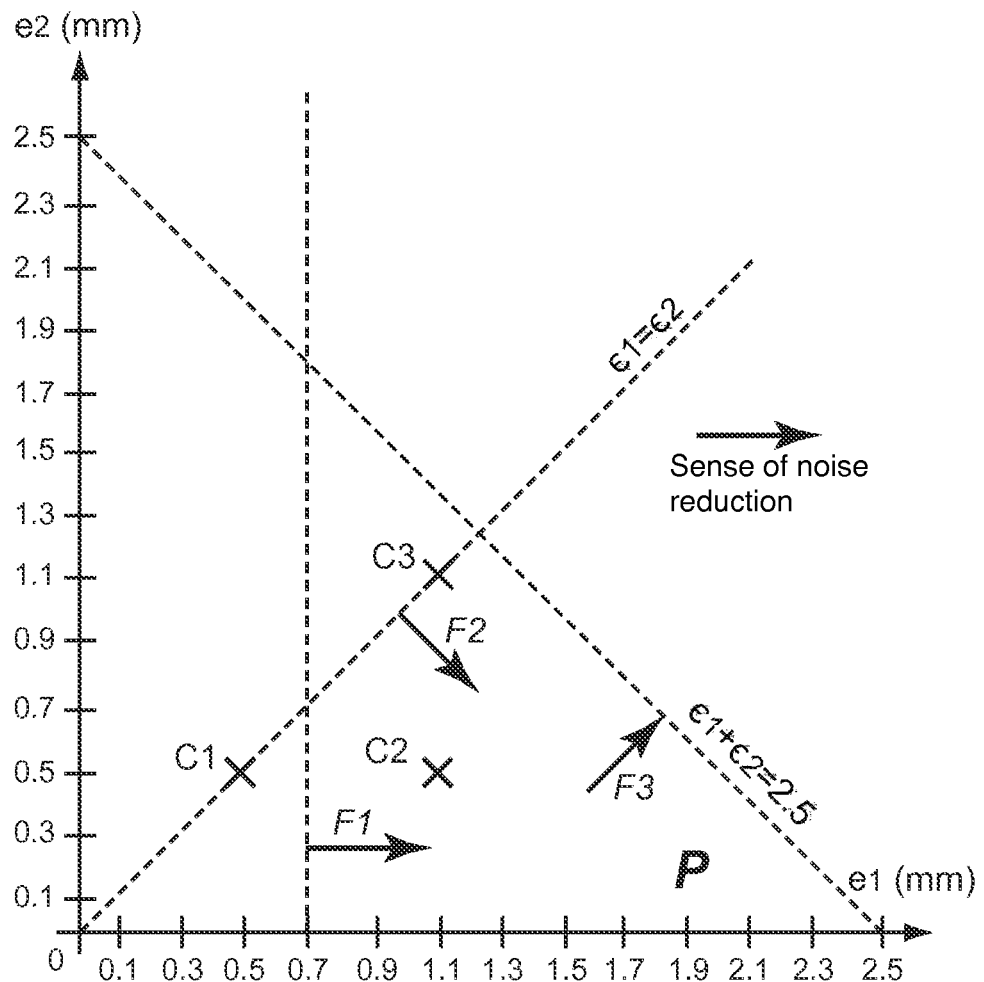
FIG. 4 is a schematic illustration of the progress of the acoustic noise as a function of the thicknesses e1 and e2 respectively of the first and second substrates when these substrates are made of glass and when the thickness e1 is greater than the thickness e2 according to one embodiment of the invention.

FIG. 4 provides a schematic illustration of the range of choice of the values (in mm) of the thicknesses $e_1$ and $e_2$ of the first and second substrates (14, 15) when the first substrate 14 with a thickness $e_1$ is considered to be thickest substrate. In this example, the range of values considered corresponds to the surface of a polygon P shown as shaded and defined by the intersection of the straight lines of the equations $e_1+e_2 \leq 2.5$ mm and $e_1 \geq 0.70$ mm and $e_2 < e_1$.

In this example, the thickest of the two substrates is the first substrate, and this corresponds to the condition $e_2 < e_1$. However, the invention can also be applied to the case where the second substrate is the thickest substrate ($e_2 > e_1$). In this case, the range of values considered for the thickness $e_1$ and $e_2$ is a polygon (not shown) defined by the intersection of the straight lines of equations $e_1+e_2 \leq 2.5$ mm and $e_2 \geq 0.70$ mm and $e_1 < e_2$. This polygon corresponds to the symmetric polygon of the polygon P of FIG. 4 obtained by axial symmetry relatively to the straight line of equation $e_2 = e_1$.

In FIG. 4, the sense of the reduction of acoustic noise is represented by three arrows F1, F2, F3 more amply described here below.

Thus, for values of the thicknesses e1 and e2 belonging to the values included within the polygon P, the acoustic noise reduction is all the greater as:
- the thickness e1 of the thickest substrate increases (arrow F1); and
- the values diverge from the straight line of equation e1=e2, i.e. according to the increase in the difference of the thicknesses (arrow F2); and
- the values approach the straight line of equation e1+e2=2.5 mm (arrow F3).

As indicated in table 1, a noise reduction of more than 2 dBa is observed in passing from the first configuration C1 to the second configuration C2 (without electronic correction which more amply described here below).

Figure 5:
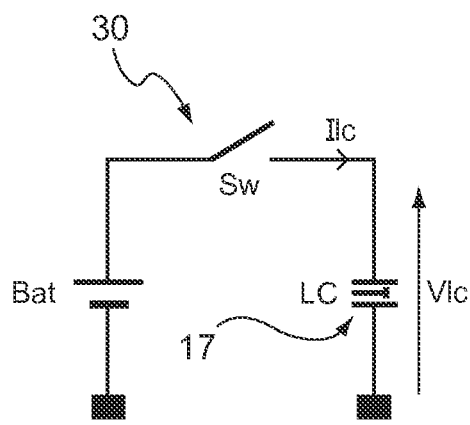
FIG. 5 is a schematic illustration of a classic electronic circuit for the switching of a liquid-crystal-based cell.

FIG. 5 schematically illustrates a classic electronic switching circuit 30 of the cell 17 based on liquid crystal 18. This circuit has a power supply module "Bat" delivering a DC voltage. To obtain the switching of the liquid crystal, this DC voltage is then transformed into a control voltage 22 which is alternately positive and negative (+V, −V) at the terminals of the cell 17. The timing is obtained in this case not by an external synchronization signal 20 coming from the projector as described in FIG. 3 but as a function of the opening and closing times of a switching element Sw (for example a transistor) placed in series between the power supply module and the cell 17. The voltage given is then a square-wave voltage which is alternately positive (+V) and negative (−V).

For example, the liquid crystal 18 is powered by a control voltage 22 of −V volts each time the switching element Sw is closed and at a control voltage of +V volts each time the switching element Sw is open.

In the case of ferroelectric type liquid crystals used in an embodiment of the present invention and very widespread for applications of fast liquid crystal displays, the values of the switching voltages are great, generally in the range of 10V/μm and the wave forms must be alternating, with leading and trailing edges that as sharp as possible so as to obtain a fast switching time. For example typical threshold voltages of 10V/μm are characteristic of smectic materials such as Felix SCE19 by the firm Merck. These values are appreciably greater in the presence of a polymer matrix.

However, the charging of a liquid crystal 18 cell 17 by a square-wave control voltage 22 produces a major percussion current which is restricted only by the output resistance of the source (typically 50 W, giving 0.3 A for a voltage of 15V). The sound wave produced is a source of acoustic noise.

Figure 6A:
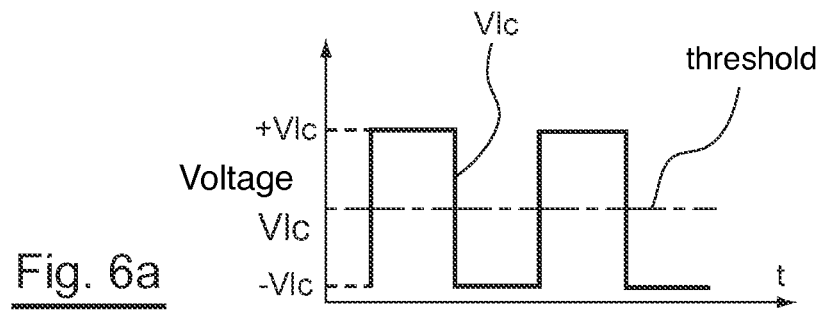
FIGS. 6a to 6d are a schematic illustration of the progress of the voltage and of the current flowing at the terminals of the cell in response to a control voltage, as well as its optical response and its acoustic response when it is powered by the electronic circuit of FIG. 5.
Figure 6B:
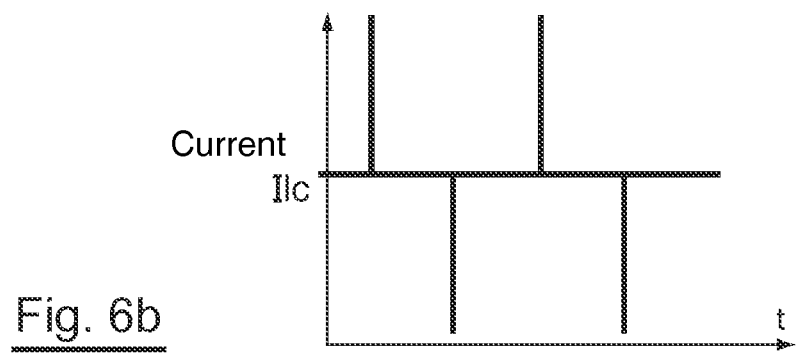
Figure 6C:
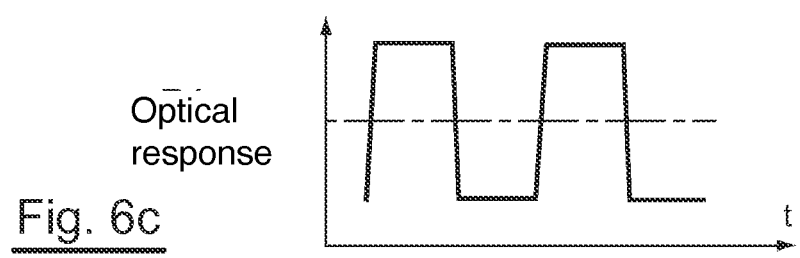
Figure 6D:
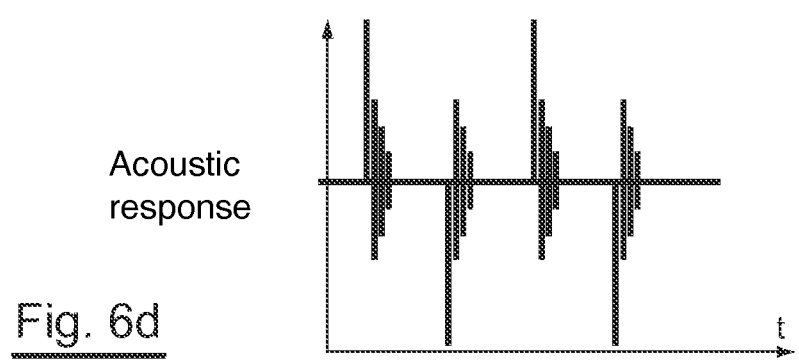

FIGS. 6a to 6d respectively illustrate the progress of the voltage Vlc (FIG. 6a) and the current Ilc (FIG. 6b) appearing at the terminals of the cell 17 in response to the control voltage 22 delivered by the electronic switching circuit 30 of FIG. 5. FIG. 6c also shows the optical response and FIG. 6d shows the acoustic response of the cell 17.

As illustrated in FIG. 6a, the voltage Vlc which appears at the terminals of the cell 17 takes the form of a square wave, timed by the leading and trailing edges of the control voltage 22. The amplitude of the voltage Vlc is equal +Vlc−(−Vlc) =2*Vlc.

At each switching of the liquid crystal 18, a percussion current Ilc appears (FIG. 6b). The optical response of the liquid crystal 17 to this control voltage is almost immediate with short rise and fall times (FIG. 6c).

FIG. 6d for its part illustrates the generation of an acoustic noise at each switching of the liquid crystal 18.

Figure 7:
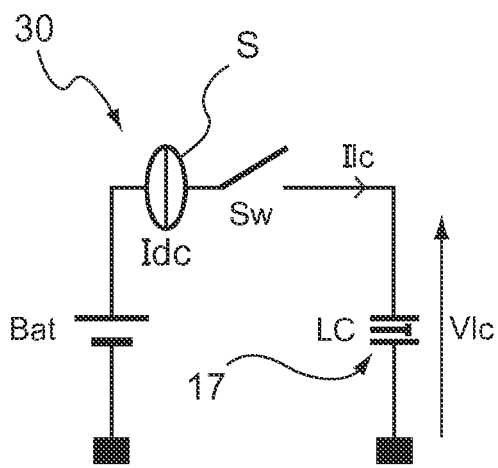
FIG. 7 is a schematic illustration of an electronic switching circuit of a liquid-crystal-based cell according to one embodiment of the invention.

One particular embodiment of the invention illustrated in FIG. 7 proposes to adapt the classic electronic switching circuit of FIG. 5 in order to attenuate the noise caused by the vibration of a glass substrate. This attenuation is achieved especially by a control of the pulse forms of the control voltage 22 of the liquid crystal 18 of the cell 17. The optimizing of the waveform must then take account not only of the response of the liquid crystal 18 but also of the way in which the glass vibrates under the effect of a variable electrostatic force.

Thus, in addition to the constituent elements of the electronic switching circuit 30 of FIG. 5 and to control the pulse forms of the control voltage 22, an embodiment of the present invention proposes an electronic switching circuit 30 enabling the noise to be limited by an adaptation of the leading edges in the case of a ferroelectric liquid crystal. Naturally, this technique can also be applied to other liquid crystals.

As described here above, the charging of a cell 18 of a liquid crystal 18 by a square wave control voltage 22 produces a major percussion current. The sound wave produced constitutes a source of acoustic noise.

To reduce this noise source, in this particular embodiment the invention proposes to place for example a current source S delivering a DC current Idc, this source S being placed between the switching element Sw and the supply module "Bat". This simple and efficient modification of the switching circuit 30 of FIG. 5 is based on the fact that if the current Idc is limited to a determined value during the switching (charging and discharging of the cell) by a current source acting as a limiter, the voltage developed on the cell grows linearly (as a first approximation) and the optical response of the cell is a sigmoid that shows a similar slope. The energy absorbed by the cell is then spread over time and the percussion noise is greatly reduced as illustrated with reference to FIGS. 8a and 8d.

Figure 8A:
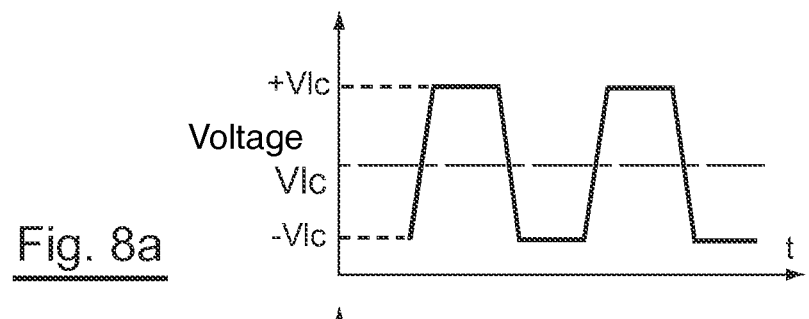
FIGS. 8a to 8d are a schematic illustration of the progress of the voltage and of the current flowing at the terminals of the cell in response to a control voltage as well as its optical response and its acoustic response when it is powered by the electronic circuit of FIG. 7.
Figure 8B:
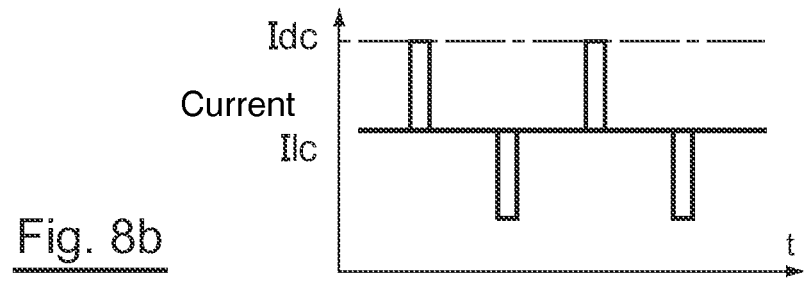
Figure 8C:
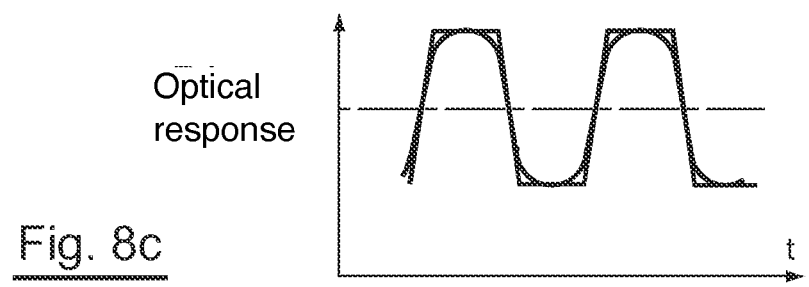
Figure 8D:
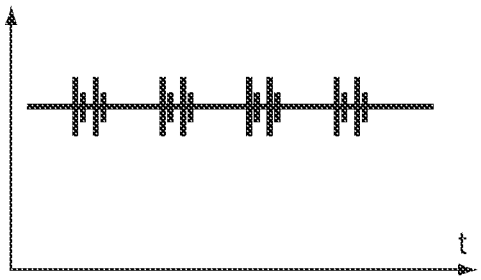

FIGS. 8a to 8d respectively illustrate the progress of the voltage Vlc (FIG. 8a) and of the current Ilc (FIG. 8b) which appear at the terminals of the optical cell 17 in response to the control voltage 22 delivered by the electronic switching circuit 30 of FIG. 7. FIG. 8c also shows the optical response of the cell and FIG. 8d shows the acoustic response of the cell 17.

As illustrated in FIG. 8a, the voltage Vlc that appears at the terminals of the cell 17 is in the form of a square wave spread over time, and is timed relatively to the leading and trailing edges of the control voltage 22. The amplitude of the voltage Vlc is equal to +Vlc−(−Vlc)=2*Vlc.

At each switching of the liquid crystal 18, a current Ilc appears (FIG. 8b). This current is furthermore limited by the value of the current Idc of the current source S acting as a limiter.

FIG. 8c illustrates the optical response of the liquid crystal 17 which, in this case, is slower. Indeed, the switching times are slower as compared with the configuration of FIG. 6c. This is therefore a compromise to be made between the limitation of the noise due to the percussion current and the switching speed of the liquid crystals.

FIG. 8d illustrates the generation of an acoustic noise at each operation of switching of the liquid crystal 18. As compared with FIG. 6d, a major reduction is observed in the acoustic noise due to the switching of the liquid crystal 18 of the cell 17.

For example, if the value of the applied voltage Vlc varies between +15 volts and −15 volts and if the intensity Idc delivered by the current source, according to an embodiment of the invention, is fixed at 5 mA (FIG. 8b), the rise times observed for the voltage Vlc (FIG. 8a) and for the optical response (FIG. 8c) are equal to 500 microseconds and 300 microseconds respectively.

These rise times correspond to the rise times needed to pass from 10% to 90% of the maximum value (+15V).

Table 1 illustrates all these results. For an equivalent configuration, the reduction of the noise is noteworthy in the presence of this current source S acting as a current limiter. For example, for the second configuration C2, the excess noise is reduced by 6.2 dBa in passing from a second configuration without electronic correction to a second configuration with electronic correction.

This is also true for the first and third configurations with a noise reduction of 5.1 dBa and 7.6 dBa respectively.

To adjust the switching time of the liquid crystal 18 and thus reduce the value of the amplitude of the percussion current, another embodiment of the invention proposes the use, as a liquid crystal material 18, of a ferroelectric liquid crystal FLC that is polymer-stabilized, thus forming a polymer-stabilized liquid crystal gel better known as PSFLC.

In another embodiment of the invention, it is proposed to use a liquid crystal material 18 that is an anti-ferroelectric smectic liquid crystal "AFLC" and a polymer thus forming a polymer-stabilized liquid crystal gel better known as PSAFLC.

The use of a polymer chain to guarantee the high stability of the structure and the non-formation of flaws results in modifying the electro-optical response of these composite structures with a switching slope value that depends on the polymer concentration to thus obtain more gradual rise times.

It must be noted that the increase in the polymer concentration is accompanied by a reduction in the switching time because of the resistance of the polymer chain to the motions of the molecules. This mechanism has the effect of also reducing the acoustic noise by limiting the impact of the electrical percussion on the rotational motion of the directional axis of the molecules.

Preferably, the concentration by density of polymer ranges from 10% to 15%. It may be recalled that PSFLC or PSAFLC polymers, like PLDC polymers, are constituted by the association of liquid crystal and polymer but are different from them in that the polymer is not encapsulated therein in the form of droplets. In the PSFLCs (or PSAFLCs), liquid crystal and polymer form a composite gel in which the liquid crystal is not encapsulated.

The PSFLC (or PSALFC) structures have different characteristics depending on the polymer content of the mixture. For higher concentrations (of over 10% by mass of polymer) it is the structure of the polymer network that acts preponderantly on the characteristics of the liquid crystal.

According to another embodiment of the invention, the cell 17 furthermore includes at least one layer of a visco-elastic material absorbing acoustic and/or mechanical energy. This layer for example made out of a polycarbonate, acrylic or PMMA (methyl polymethacrylate) type material and can especially take the form of foil absorbing acoustic energy or certain frequencies of this acoustic energy. The visco-elastic material can also be a viscous liquid confined by a plastic foil or a glass plate. This material must be transparent, non-toxic, non-volatile, with high viscosity (preferably greater than 4.5 Pa·s). For example, it consists of a mixture of one part of PEG-4000 to three parts of PEG400.

For a liquid-crystal-based cell used to make a screen 11 for the viewing goggle set 10 as described here above, this layer must have an index and an isotropy adapted to the application, i.e. the layer of absorbent material must be transparent in the visible domain and possess an index close to that of the other layers of material, i.e. the material of the first and second substrates of the cell 17, in order to limit parasitic reflections and residual anisotropy.

This use of a layer of an absorbent material thus improves the reduction of the vibrations induced by the switching over of the liquid crystals under a switching voltage.

Naturally, to reduce the acoustic noise generated by the vibration of the first and second substrates during the switching of the liquid crystal 18, it is possible to implement only one of the two combined solutions described here above, namely an optical shuttering device comprising:
  either an implementation of the cell 17 according to the dissymmetric configuration of the first and second substrates, as described with reference to the second configuration C2;
  or an implementation of a classic cell, i.e. with a symmetrical configuration, for which the switching circuit of the liquid crystals includes an electronic correction using an additional current source acting as a limiter.

However, it is important to note that the combined effect of a dissymmetrical configuration and of an electronic correction using an additional current source acting as a limiter goes beyond the juxtaposed effect of the two individual factors. This justifies their combination which has a truly inventive character.

The present invention is not limited of course to the preferred embodiment described here above by way of a non-restrictive example. It concerns for example any optical display device comprising an optical shuttering device according to the present invention. It also concerns all the alternative embodiments within the scope of those skilled in the art within the framework of the following claims.

At least one embodiment provides a technique for efficiently reducing the acoustic vibrations caused by the electrostatic force generated during the switching of the liquid crystals while at the same time optimizing the weight of the cell constituted by the two substrates and the liquid crystal and, all the more so, to reduce the weight of the optical shuttering device according to one particular embodiment.

At least one embodiment provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. An optical shuttering device comprising:
  an optical cell formed by a first transparent substrate and a second transparent substrate laid out so as to be facing each other to form a free space;
  a liquid crystal material placed in said free space; and
  an electronic circuit configured for switching said cell between a passing state and a blocking state, comprising:
    a power supply module providing a switching control voltage to said cell;
    a switching element, which is series-mounted between said power supply module and said cell, enabling said cell to be made to switch between the passing state and the blocking state; and
    a direct current source, which is series-mounted between the power supply module and the switching element and limits current from the power supply module to a determined value during switching of the cell.

2. The device according to claim 1, wherein the first and second substrates have respective thicknesses and that are different and wherein:
- a total cumulated thickness of said first and second substrates is smaller than or equal to 2.50 mm; and
- the thickest substrate among said first and second substrates is made of glass and possesses a thickness greater than 0.70 mm.

3. The device according to claim 2, wherein the least thick substrate is made of glass and has a thickness less than or equal to 1 mm.

4. The device according to claim 2, wherein the least thick substrate is made of plastic and has a thickness of less than or equal to 0.5 mm.

5. The device according to claim 1, wherein the liquid crystal material comprises an association of at least one liquid crystal and one polymer, thus forming a liquid crystal gel stabilized by said polymer.

6. The device according to claim 5, wherein said association of at least one liquid crystal and one polymer is such that the concentration in mass density of the polymer ranges from 10% to 15%.

7. The device according to claim 1, wherein the liquid crystal material comprises an association of at least one ferroelectric smectic liquid crystal FLC or anti-ferroelectric smectic liquid crystal AFLC and a polymer, thus forming a liquid crystal gel stabilized by said polymer, better known by the names PSFLC or PSAFLC respectively.

8. The device according to claim 7, wherein said association of at least one liquid crystal and one polymer is such that the concentration in mass density of the polymer ranges from 10% to 15%.

9. The device according to claim 1, wherein the device further comprises at least one transparent layer of viscoelastic material.

10. A viewing goggle set comprising an optical shuttering device, which comprises:
- an optical cell formed by a first transparent substrate and a second transparent substrate laid out so as to be facing each other to form a free space;
- a liquid crystal material placed in said free space; and
- an electronic circuit configured for switching said cell between a passing state and a blocking state, comprising:
  - a power supply module providing a switching control voltage to said cell;
  - a switching element, which is series-mounted between said power supply module and said cell, enabling said cell to be made to switch between the passing state and the blocking state; and
  - a direct current source, which is series-mounted between the power supply module and the switching element and limits current from the power supply module to a determined value during switching of the cell.

11. An optical display device comprising an optical shuttering device, which comprises:
- an optical cell formed by a first transparent substrate and a second transparent substrate laid out so as to be facing each other to form a free space;
- a liquid crystal material placed in said free space; and
- an electronic circuit configured for switching said cell between a passing state and a blocking state, comprising:
  - a power supply module providing a switching control voltage to said cell;
  - a switching element, which is series-mounted between said power supply module and said cell, enabling said cell to be made to switch between the passing state and the blocking state; and
  - a direct current source, which is series-mounted between the power supply module and the switching element and limits current from the power supply module to a determined value during switching of the cell.

* * * * *